Patented Dec. 9, 1947

2,432,222

UNITED STATES PATENT OFFICE 2,432,222

DEHYDRATED FOOD PRODUCT

Alexander M. Zenzes and William Schloessinger, New York, N. Y.

No Drawing. Application June 17, 1944, Serial No. 540,900

3 Claims. (Cl. 99—204)

The invention relates to a method for the production of a stable, dehydrated food and to a product so produced. More particularly, it pertains to the preparation of a dehydrated non-sugar bearing vegetable of high moisture content and includes correlated improvements and discoveries whereby the desirable qualities thereof are enhanced.

According to present commercial practice, dehydrated vegetables require removal of their moisture content to very low limits in order to safeguard the keeping quality of the finished product. Further, such dehydration is expensive and damages the food and taste values.

In co-pending applications, Serial Nos. 516,593 and 530,182 processes are described to stabilize dehydrated vegetables at high moisture content by introducing sufficient sugar into the liquid phase to render it non-perishable.

Added sugar, however, may not always be desirable, and the present invention relates to an improved method of stabilizing and preserving the liquid phase of dehydrated vegetables by a combination of a sugar with other substances, such as edible salts, for instance, sodium chloride, sodium malate and the like, and an edible organic acid, e. g., acetic, lactic, and similar acids, and generally with compounds which have a preservative action upon the food.

It is an object of the present invention to produce stable, non-perishable dehydrated food substances, particularly meats and vegetables of high moisture content, that is, from about 5% to about 25%.

Another object of this invention is to render the liquid phase of a dehydrated vegetable nonperishable.

Still another object is to increase the osmotic pressure of the liquid phase of a dehydrated vegetable by impregnation with a salt, or a sugar, and especially combinations thereof.

A further object relates to the preservation of the liquid phase of dehydrated vegetables by an edible organic acid, suitably lactic acid, and preferably not as an added ingredient but produced by bacterial action giving the desired quantity in the liquid phase thereof.

An additional object pertains to procedural economies by simultaneously effecting various steps in the pretreatment of vegetables such as impregnating while bleaching; while flavoring, and/or while sulphiting.

A specific object relates to the prevention of deterioration of dehydrated vegetables in storage.

Still further objects and advantages will appear from the more detailed description given below. It being understood, however, that the more detailed description is given by way of illustration and explanation only and not by way of limitation, since various changes may be made by those skilled in the art without departing from the scope and spirit of the present invention.

The present invention is particularly applicable to vegetables which are substantially non-sugar bearing. Hence, vegetables, such as the sugar beet and fruits which contain more than 5% sugars are not included, except where the preservative or stabilizing effect is produced by impregnation with substances other than sugar.

We have found that dehydrated vegetables may be rendered non-perishable if the liquid phase is so conditioned as to both the moisture and the concentration of the solutes therein, so that spoilage, particularly undesirable fermentation is prevented. As a result of our experimental findings, we believe that a dehydrated vegetable or food generally comprises two distinct phases, namely a water insoluble solid phase which is non-perishable per se, and a liquid phase containing all of the water and water soluble matter. It is the latter phase which requires preservation and stabilization, and this effect may be achieved by introducing into the liquid phase a preservative constituent, for instance by immersion or by spray, or by other suitable means, which will render the liquid phase non-perishable.

The use of added sugar is described in a co-pending application, Serial No. 530,182. Where the use of added sugar may not be desired for reasons of taste, for example, we now find that an edible salt, as common table salt, will give protection to the liquid phase. This protection depends upon distribution in liquid form, and generally is accomplished through redistribution of the moisture of the dehydrated food substance so as to set up a substantially continuous liquid phase which is of uniform concentration. The amount of salt required is less than 30% of that of sucrose. Where a safe sucrose density limit of the liquid phase is not less than 66% we find that 15% to 25% sodium chloride concentration is effective.

The following example relates to salt only and is predicated upon the finding that about 20% salt concentration in the liquid phase will inhibit decomposition and spoilage. The figures are given with respect to the added salt content only, and in actual practice both the salt and the sugar concentration, the latter being particularly sucrose, is higher.

EXAMPLE 1

| | |
|---|---|
| Fresh vegetable containing 90% water grams | 100 |
| Semi dehydrated weight do | 56 |
| Impregnated for ½ minute with NaCl solution of 10% by weight grams | 71 |
| Dry salt equivalent transferred do | 1.5 |
| Finished weight do | 16 |
| Total moisture content of finished product per cent | 28 |
| Salt concentration of liquid phase do | 25 |
| Salt concentration refreshed vegetable basis per cent | 1.5 |

The foregoing example is an illustration of the preservative action which added salt exerts when introduced into and forming part of the liquid phase of a dehydrated food. A method of stabilizing the liquid phase as such with respect to moisture content is presented in a co-pending application of one of us.

Salt is hygroscopic but not sufficiently so for full stabilization. Therefore a preferred method entails combining simultaneously salt and an invert sugar, for instance, in such proportions that half of the total impregnated solids are invert sugar solids. Vegetables so impregnated show, in addition to a preservative effect, a stabilizing effect, and the following example illustrates a mode of procedure.

EXAMPLE 2

| | |
|---|---|
| Fresh spinach (90% water) grams | 100 |
| Weight after washing do | 130 |
| Semi-dehydrated weight do | 48.6 |
| Weight after impregnation do | 73.7 |
| Impregnating liquid: | |
| Water cubic centimeters | 380 |
| Invert syrup, 80° Brix, 95% inverted grams | 100 |
| Common salt do | 20 |
| Wetting agent | Traces |
| Finished dehydrated weight grams | 16.6 |
| Dry sugar equivalent absorbed do | 3.2 |
| Dry salt equivalent absorbed do | 0.8 |
| Moisture (2.6 gms.) per cent | 15 |

The weight of this sample remained stable through a four-month period when stored in open containers, and it did not fluctuate beyond 16.7 and 16.5 gms.

We prefer to use salt having a moderate amount of calcium and/or magnesium salts present as impurities, since pure sodium chloride does not exercise the same stabilizing effect due, it is thought, to lack of hygroscopicity.

Certain vegetables diffuse more readily when immersed in a liquid medium having a higher osmotic pressure than their own than do others. Shredded carrots and similar roots do not present this difficulty, but shredded cabbage may lose by simple immersion in a sugar solution of 25° Brix within a few minutes, up to 30% of its moisture content. While immersion is preferred, we have found that spraying avoids loss of original plant liquid, and where the surfaces so sprayed are highly irregular, like for instance, in broccoli, or where they are covered by a waxy surface like the cabbage leaf, the objects of the present invention are more readily accomplished if the impregnating liquid is employed in conjunction with a suitable surface active agent, as a sulphated higher alcohol, having a better wetting effect than the liquid itself.

The following example illustrates utilization of an invert sugar syrup together with a small amount of a sulphonated or sulphated higher fatty alcohol which gives a faster redistribution of the moisture. This shorter time is an important advantage of the present invention, and compares very favorably with present commercial practice which requires, for instance, a five-hour period to dehydrate carrots to 8%, followed by a second dehydration period of about 18 hours at elevated temperature to reduce the moisture to 5%, which is by far the costlier step of the two. In our process the entire period of dehydration with like equipment is but a fraction of the foregoing figures.

EXAMPLE 3

*Cabbage impregnated in presence of wetting agent while sulfiting*

| | Grams |
|---|---|
| Fresh shredded cabbage (93% water) | 100 |
| One quarter dehydrated | 80 |
| Impregnated by atomized spray of following composition: | |
|   Invert sugar having 50% inversion at 50° Brix and 150° F. | |
|   Traces of wetting agent (a sulphated alcohol) | |
|   0.5% SO₂ in the form of equal weights of sodium sulphite and sodium meta bisulphite | |
| Weight after spraying | 90 |
| Dehydrated to final weight of | 14.5 |

Spraying by atomization is more effective in the presence of a suitable wetting agent, but is less preferable than immersion. Where it is desired to add a sugar in dry form, we found it advisable to use a sugar having maximum surface such as amorphous sugars which crystallize instantly from a highly supersaturated solution.

The foregoing procedures are applicable to vegetables grown either in or above the ground, and also to flesh foods. Both the release of moisture and the impregnation proceed slowly. Hence the "sponge method," i. e., partial dehydration prior to impregnation, of this and co-pending applications, was developed to accelerate impregnation.

Further, we have found that high impregnation may be achieved by the use of vegetables growing in a marine medium of high pressure and high osmotic pressure. Such a vegetable, when dehydrated under atmospheric pressure, will dehydrate within a few minutes. The relative conditions of dehydration are comparable in a sense to an ordinary surface vegetable being dehydrated under high vacuum.

Moreover, these vegetables, when impregnated with a sugar according to the present invention, will retain their green color indefinitely after dehydration. Samples of sea-kale, kelp and other algae, when dehydrated without impregnation, lost their color completely within two weeks after dehydration and turned into a flavorless, brittle, yellowish, strawlike mass. Such marine plants rehydrate instantly when dipped in a sugar solution, and we have impregnated them with more than 10 times their own dry weight of invert sugar syrup at 32° Brix.

A co-pending application refers to the preservative effect which certain acids impart to the liquid phase, and sets forth that suitable acids may be introduced into the liquid phase simultaneously with sugar impregnation. This entails the use of added acid, and we have now found it of advantage to subject the vegetable prior to dehydration to controlled lactic acid fermentation, preferably by adding pure cultures of selected lactic acid organisms to a vegetable in a brine of suitable salt concentration with fermentation being arrested as soon as the desired amount of lactic acid is produced. It is one of the advantages of this process that the amount of acid required is distinctly less than that required in known fermented vegetables, such as sauerkraut and the like, which have a free acid content, expressed as lactic, of about 1½%. Where such fermentative acidity is produced it is preferably applied in combination with salt and/or sugar impregnation.

When an acid is introduced into the liquid phase, it has been found that acetic acid, when concentrated in the liquid phase to form a solution of at least 15% stabilizes against bacterial decomposition. The acidity in the liquid phase is not noticeable to the taste after the vegetable has been reconstituted to its original fresh weight.

The advantage of the sponge method referred to previously is well shown in the dehydration of carrots. Fresh carrots, when immersed immediately after slicing in a bath of 32° Brix, retained merely 6.3% of their weight in terms of syrup weight. However, when carrots were first subjected to slow dehydration avoiding case hardening, they retained 20% of their own weight in terms of weight of syrup. Hence the method affords a reliable and efficient mode of rapidly transferring a desired amount of invert sugar or other solids into a vegetable without prolonging immersion to a point where the vegetable releases its water soluble material to the impregnating liquid.

When it is desired to impart a preservative result to the liquid phase of vegetables or flesh foods, and a moderate amount of added sweetness is undesired, such effect may be obtained by impregnation with a polyhydric alcohol, as a sorbitol, or a mannitol, or other hexahydric alcohol, or a polyglycol, or alcohol.

A vegetable or other foodstuff impregnated with a sugar tends to decompose unless concentrated as indicated herein. When using, however, a hexahydric alcohol as an impregnation medium, we have found that the usual fermentative organisms do not act upon the alcohol containing liquid phase. Furthermore, while molds may be active in dilute concentrations, they are completely inactive where the alcohol concentration in the liquid phase of the dehydrated food exceeds 50%. The hexahydric alcohols and inner ethers thereof are preferred impregnation media, and their protective property has the additional advantage that it is coupled with a lower sweetening power and a higher moisture retention capacity than ordinary sugar, for instance.

Thus dehydrated vegetables and other foods may be produced with a high moisture content and having a stable, non-perishable liquid phase with less interference with the taste, flavor, or food value of the dehydrated product.

Where it is desired to protect a vegetable against oxidative color changes, as for instance the epithelial layers of carrots and other root vegetables, such protection may be imparted by dipping prior to impregnation in a water bath having a pH value from about 2.5 to about 3.5, or one containing thiourea in sufficient concentration to transfer between one tenth and one twentieth of one percent. upon the food after impregnation.

The preferred embodiment of the present invention resides in a combination of a sugar and an edible salt as an impregnating agent for rendering the liquid phase of the finished dehydrated product non-perishable at a relatively high moisture content. In terms of osmotic pressure alone we find that about one fifth the quantity of salt replaces a given quantity of sucrose. When common salt is added, the quantity of sucrose or other sugar may be more than correspondingly reduced and the saturation relationships in the liquid phase are such that increasingly large quantities of salt are held in solution as the sugar is reduced downward from a 66° Brix level.

An outstanding advantage of the process resides in the fact that dehydrated flesh foods and vegetables may be produced in a stable, non-perishable form with a free moisture content as high as 25%. The salt may effectively be used either alone forming a salt concentration of 20% in the liquid phase, or in combination with sugar, preferably an invert sugar, thus reducing the quantity of sugar substantially. Furthermore, as shown by Example 2, such salt-invert sugar combination exerts, in addition to its preservative effect upon the liquid phase, a weight stabilization effect.

The impregnation procedure described herein provides a manner of introducing, simultaneously with the sugar and the salt, other desired ingredients, such as, for instance, sulphitation in the case of cabbage, introduction of sulphydryl compounds, impregnation with flavoring salts, such as mono sodium glutamate, addition of wetting agents, addition of humectants, such as sorbitol and glycerine, and addition of enzymes, such as diastase.

When a sugar is used for impregnation of the liquid phase we prefer dextrose which for equal weights has a higher osmotic pressure than sucrose and a lower sweetness. Moreover, we may use combinations of sucrose and dextrose instead of an invert sugar or a sucrose solution.

The products obtained by the present invention are stable at high moisture content and resist enzymatic changes even when packed in air. Due to the high liquid content retained therein the refreshening step is shortened, and the amount of water required for refreshening is lessened. The original color and flavor are improved as compared to dehydrated vegetables or flesh foods made by known methods, and the cost of production is lower in that removal of the terminal moisture content is not necessary.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A dehydrated food containing from about 5% to about 25% of moisture and having a liquid phase containing added sorbitol in an amount to produce in the liquid phase after dehydration a concentration thereof from about 40% to about 60%.

2. A dehydrated food having a stabilized liquid phase comprising an added polyhydric alcohol.

3. A dehydrated food having a stabilized liquid phase comprising an added polyglycol.

ALEXANDER M. ZENZES.
WILLIAM SCHLOESSINGER.

REFERENCES CITED

The following references are of record in the file of this patent:

UNITED STATES PATENTS

| Number | Name | Date |
| --- | --- | --- |
| 1,259,635 | King | Mar. 19, 1918 |
| 1,387,710 | Harrison | Aug. 16, 1921 |
| 2,363,193 | Moore | Nov. 21, 1944 |
| 1,393,540 | Kelley | Oct. 11, 1921 |
| 1,399,471 | Faitelowitz | Dec. 6, 1921 |
| 2,065,863 | Madans | Dec. 29, 1936 |
| 2,192,041 | Headland | Feb. 27, 1940 |
| 144,592 | Barbee | Nov. 18, 1873 |
| 468,751 | McKinney | Feb. 9, 1892 |
| 2,354,495 | Bodenstein | July 25, 1944 |
| 1,944,265 | Pilory | Jan. 23, 1934 |